United States Patent Office 3,532,654
Patented Oct. 6, 1970

3,532,654
POLYMERIC COMPOSITION
William M. Finn, Framingham, and Francis L. McCarthy, Quincy, Mass., assignors to A. E. Staley Manufacturing Company, Decatur, Ill., a corporation of Delaware
No Drawing. Filed May 9, 1967, Ser. No. 637,074
Int. Cl. C08f 45/52, 45/26
U.S. Cl. 260—28.5                    20 Claims

ABSTRACT OF THE DISCLOSURE

Latex polymer having an average monomer Tg of at least 40° C. containing polymerized units of ethylenically unsaturated acid, an ethylenically unsaturated hard monomer and ethylenically unsaturated waxy monomer suitable for the preparation of buffable dry-bright polishes containing a 1-to-1 or higher weight ratio of polymer to wax.

---

This invention relates to a latex polymer suitable for the preparation of completely buffable dry-bright polishes containing a 1-to-1 or higher weight ratio of polymer to wax, wherein said latex polymer has an average monomer Tg of at least 40° C. and contains polymerized units of an ethylenically unsaturated acid, an ethylenically unsaturated hard monomer and ethylenically unsaturated waxy monomer. More specifically this invention relates to a latex polymer suitable for the preparation of completely buffable dry-bright polishes containing a 1-to-1 or higher weight ratio of polymer to way, wherein said latex polymer has an average monomer Tg of at least 40° C., contains polymerized units of an ethylenically unsaturated acid, an ethylenically unsaturated hard monomer and ethylenically unsaturated waxy monomer, and is a graft copolymer containing a backbone polymer containing waxy monomer units having an average monomer Tg of about 30 to 70° C. and a graft portion having an average monomer Tg of at least 80° C.

It is well known that floor polishes are grouped into two separate and distinct types. On the one hand, there are the so-called "dry-bright" nonbuffable polishes, which are based on synthetic latex polymers, and on the other hand, the buffable polishes, which are based on natural and synthetic waxes.

The "dry-bright" non-buffable polishes spread easily, dry quickly and form a high-gloss film without buffing. The film is considerably harder, more resistant to slipping and more resistant to dirt pick-up and scuffing than a polish film produced by a buffable polish. If desired, the film can be recoated immediately after application. Maintenance of a non-buffable polish is much easier, since only occasional damp mopping is needed to keep the film clean and bright. However, once a non-buffable polish film is scratched, very little can be done to restore its original appearance other than applying another coat of polish since the film is so hard that the scratches cannot be removed by buffing.

Generally, buffable polishes do not level as well as the non-buffable polishes and require buffing in order to form a high gloss film. The film, generally, cannot be recoated for 2 to 24 hours. The film scuffs more easily than a non-buffable polish film, but scuff marks and scratches can be removed fairly easily by buffing. Because of this property, a buffable polish can outlast a non-buffable formulation by a considerable margin. However, a buffable polish requires more work than non-buffable polishes thereby requiring a larger labor force and buffing machines. In spite of this, many commercial establishments feel that buffable polishes are a better all-around investment for floors taking heavy foot traffic. It is quite common to have the high traffic areas buffed each night.

As indicated above, the buffable polishes contain wax as the principal film former while the non-buffable polishes contain a synthetic polymer as the principal film former. In the February 1964, issue of Paint Manufacture, volume 43, No. 2, pages 45 to 49 and 53, R. Zdanowski of the Rohm & Haas laboratory points with pride to the fact that a popular commercial buffable polish could have up to 30% of the Fischer-Tropsch polyethylene wax formulation replaced with Rhoplex B-83 polymer emulsion and still retain buffability characteristics of the 100% wax product. However, when Zdanowski attempted to employ a 1-to-1 weight ratio of polymer to wax, the resulting floor polish had only fair buffability characteristics. The exact reason or reasons that the art has been unable to produce a fully buffable floor polish containing a 1-to-1 or higher ratio of latex polymer to wax is not clear. However, the Tg (glass transition temperature) of latex polymers used in floor polishes sheds considerable light on this subject.

The Tg (glass transition temperature) of a polymeric emulsion may be measured, as described by Cahill and McCarthy in Soap and Chemical Specialities 30, No. 4, 88 ff. (April 1964). At this temperature, a high molecular weight thermoplastic polymer changes from a hard, somewhat brittle form to a rather soft, rubbery form. A number of properties undergo a large change within a narrow temperature range, among them torsional stiffness. Measurements of torsional stiffness are made in accordance with ASTM Test Method D 1043–51 at a series of temperatures bridging the transition temperature. These values are plotted and the linear portions of the curve are extrapolated to an intersection which is the glass transition temperature.

The Tg of a polymer emulsion is dependent principally on the monomer or monomers making up the polymer and to a lesser extent on the concentration of emulsifier or emulsifiers (weight ratio of emulsifier to polymer). While generally, the Tg of the polymer emulsion decreases as the weight ratio of emulsifier to polymer increases, the effect of the emulsifier on polymer Tg can be ignored, since most latex polymers used in floor polishes have about the same relatively low level of emulsifier. This is due to the fact that water resistance of floor polishes tends to decrease as the emulsifier content increases. In most cases the Tg of a polymer can be calculated with relatively good accuracy by computing the average Tg's of the individual monomers making up the polymer. The term "average monomer Tg" refers to the sum of the product of the Tg of each monomer in the polymer times the number of parts by weight of said monomer divided by the total number of parts by weight of each monomer. For example, a polymer composed of 80 parts by weight of a monomer having a Tg of 100° C. and 20 parts by weight of a monomer having a Tg of −20° C. has an average monomer Tg of $$\frac{(80 \times 100) + (20 \times -20)}{100} \text{ or } 76$$

The Tg of a polymer emulsion increases as the concentration of hard monomer in the polymer increases and, conversely, decreases as the concentration of soft monomer increases. The terms "hard" and "soft" are used herein in reference to polymers formed from the monomers alone, in the way that is common in this technology. See Riddle, Acrylic Esters, Reinhold Publishing 1954, p. 58 et seq; also U.S. Pat. No. 2,795,564. Generally, this refers to the "brittle-point" of the polymer, i.e. the temperature at which the polymer breaks upon flexing. Hard monomers have brittle points in excess of 20° C. For example, the brittle point of styrene, acrylonitrile and methyl methacrylate is about 100° C., while the brittle points of ethyl acrylate, butyl acrylate, 2-ethylhexyl acrylate and commercial lauryl methacrylate are respectively —20° C., —45° C., —55° C., and —55° C.

Latex polymers are generally prepared for use in "dry-bright" floor polishes from monomers having an average Tg above room temperature and polymerized in a manner assuring that the polymeric particles do not contain polymeric segments having a Tg below room temperature. If the polymers have a Tg below or near room temperature, the polish films lack the hard, abrasion resistance necessary and tend to pick up dirt, black heel marks, etc. Accordingly, it is not too surprising that floor polishes containing in excess of 50% by weight of the latex polymers normally used to prepare "dry-bright" non-buffable floor polishes do not form desirable buffable polishes, since films of these polymers, which have a Tg above room temperature along the whole polymer chain, would not be expected to deform under pressure at a temperature below their brittle point. In contrast the waxes used to prepare buffable polishes deform or flow under pressure at room temperature. One might believe that fully buffable polishes containing a high ratio of latex polymer to polymer to wax could be produced by using a relatively polymer, such as one used to prepare paints. However, Zdanowski supra showed that this was not the case.

The general object of this invention is to provide synthetic latex polymers which can be formulated into "dry-bright" buffable floor polishes having many of the desirable properties of both the buffable polishes and "dry-bright" polishes. A further object of this invention is to provide synthetic latex polymers which can be formulated into completely buffable "dry-bright" floor polishes having a relatively high ratio of synthetic polymer to wax that spread easily, dry quickly to a high gloss film without buffing, resist black heel marking, resist scuffing, but when scratched can be buffed back to the original high-gloss appearance. Other objects will become apparent from the description below.

We have now found that the objects of this invention can be attained with a latex polymer having an average monomer Tg of at least 40° C. comprising (A) from 1 to 15% by weight of alpha, beta-ethylenically unsaturated acid,
(B) from 45 to 85% by weight of ethylenically unsaturated hard monomer,
(C) from 10 to 40% by weight of straight chain waxy alkyl esters of alpha, beta-ethylenically unsaturated carboxylic acids having the structure

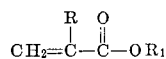

wherein each R is selected from the group consisting of hydrogen and methyl and each $R_1$ is a straight chain unsubstituted alkyl group of at least 12 carbons,
(D) from 0 to 30% by weight of soft alkyl ester of alpha, beta-ethylenically unsaturated carboxylic acid wherein said alkyl group is selected from the class consisting of primary alkyl groups containing less than 12 carbon atoms, secondary alkyl groups and mixtures thereof, and the total concentration of waxy alkyl ester and soft alkyl ester is from about 10 to 50% by weight.

Preferably, the latex polymer is a graft copolymer comprising from about 50 to 95% by weight of a backbone polymer having an average monomer Tg of about 30 to 70° C. comprising
(1) at least part of monomer (B)
(2) substantially all of monomer (C)
and a graft portion comprising the remainder of monomers (A), (B), (C), and (D) in such proportions that said monomers have an average monomer Tg of about 80 to 125° C.

Although the exact reason that the above latex imparts buffability to floor polishes containing a 1-to-1 or higher weight ratio of polymer to wax has not been proved, it is clear that the long waxy side chains in the polymer are responsible for buffability. Other things being equal, polishes based on polymers having shorter side chains, such as 2-ethylhexyl and/or decyl, lack buffability and tend to pick up dirt at an undesirably fast rate. We believe that the long waxy side chains distributed along the polymer chains are (1) readily deformable and flow under pressure, thereby healing scratches in the polish film, and (2) enhance the compatibility of polymer and wax, thereby making a small amount of wax more effective. In effect the polymer appears to function as both a dry-bright latex polymer and as a wax.

As indicated above, the latex polymer must have an average monomer Tg of at least 40° C. If the average monomer Tg of the polymer is below about 40° C., the applied polish lacks the wear properties normally expected of a latex "dry-bright" polish, i.e. the polish surface is soft and readily picks up dirt and black heel marks. The wear properties of the applied polish is improved further by using a latex graft copolymer comprising a backbone polymer having an average monomer Tg of about 30 to 70° C., which contains substantially all of the "waxy" monomer and a graft portion having an average monomer Tg of about 80 to 125° C. The backbone portion of the polymer imparts buffability to the polish while the graft portion helps prevent scuffing and dirt pick up. As indicated below, the optimum ratio of backbone polymer to graft portion is dependent upon the particular monomers in each portion and the concentration of "waxy" monomer in the backbone polymer.

The alpha, beta-ethylenically unsaturated acid acts as a leveling aid, enhances the stability of the latex emulsion and enhances the subsequent removal of the floor polish. Suitable alpha, beta-ethylenically unsaturated acids include alpha, beta-ethylenically unsaturated carboxylic acids such as acrylic acid, methacrylic acid, ethacrylic acid, itaconic acid, monobutyl itaconate, etc. The alpha beta-ethylenically unsaturated acid can comprise from about 1 to 15% by weight of the emulsion polymer. At the low end of the range the applied polish tends to be somewhat difficult to remove from the flooring, while at the upper end of the range the applied polish tends to be less detergent resistant than desired. Accordingly, it is preferable to use the acid monomer in a concentration of about 3 to 8% by weight of the polymer. If a graft polymer is employed, the acid monomer can be present in the backbone polymer portion or the graft portion or both portions. Preferably, at least some acid monomer is present in the backbone portion.

Suitable hard monomers include monovinyl aromatics such as styrene and ring-substituted styrene (vinyl toluene, 2,5-dichloro styrene, isopropylstyrene, t-butylstyrene); alpha, beta-ethylenically unsaturated nitriles, such as acrylonitrile and methacrylonitrile; hard esters of alpha, beta-ethylenically unsaturated carboxylic acids such as methyl methacrylate, propyl methacrylate, tert-butyl methacrylate, cyclohexyl acrylate, dimethyl itaconate and dimethyl maleate; vinylidene chloride; difunctional monomers such as divinyl benzene and diethylene glycol dimethacrylate, etc. The hard monomer should comprise from about 45 to 85% by weight of the polymer in order to impart the necessary wear properties to polishes prepared from the latex polymers of this invention. (However, difunctional monomers should not comprise more than about 5% by weight of the polymer.) If the polymer contains less than about 45% by weight hard monomer the applied polish tends to be too soft. On the other hand, if the polymer contains more than 85% by weight hard monomer, the applied polish tends to craze and lacks buffability.

The preferred hard monomers are styrene, acrylonitrile and methyl methacrylate. Generally speaking, polishes based on polymers having a high concentration of acrylonitrile and styrene have better detergent resistance than polishes containing a high concentration of methyl methacrylate. Further, the polar nature of the nitrile group of acrylonitrile and methacrylonitrile (Tg 134° C.) enhances the leveling properties of the final polish, adhesion to new title, which sometimes can be a problem, and imparts a toughness to the final polish of somewhat greater degree than that provided by either styrene or methyl methacrylate. However, the "waxy" monomers do not copolymerize readily under aqueous emulsion polymerization conditions with monovinyl aromatics and/or alpha, beta-ethylenically unsaturated nitriles in the absence of a substantial concentration of hard and/or soft (meth)acrylate monomer. Accordingly, in order to insure that the "waxy" monomer polymerizes smoothly, it is preferable to use more methyl methacrylate than either acrylonitrile or styrene during the polymerization of the "waxy" monomer. In addition, polymers high in methyl methacrylate tend to have more depth of gloss than polishes which are high in the other hard monomers. The monovinyl aromatics have the additional drawback that when used in a concentration of more than about 15 to 20% by weight of the polymer they contributed to the polish being susceptible to black heel marking. However, substantially higher concentrations of monovinyl aromatic monomer can be, and advantageously is, incorporated in the latex polymer if employed in a subsequent graft polymerization step. When incorporated into the polymer latex in this form the monovinyl aromatic tends to reduce black heel marking and improves the overall performance of the floor polish. For optimum properties, it is preferable to use at least some monovinyl aromatic, some alpha, beta-ethylenicaly unsaturated nitrile and some hard ester of alpha, beta-ethylenically unsaturated carboxylic acid in the polymer.

Suitable "waxy" monomers useful in this invention are straight chain waxy alkyl esters of alpha, beta-ethylenically unsaturated carboxylic acids having the structure

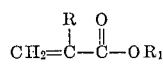

wherein each R is selected from the group consisting of hydrogen and methyl, each $R_1$ is a straight chain unsubstituted alkyl group of at least 12 carbon atoms, preferably, the average length of $R_1$ is more than 12 carbon atoms and comprises at least two esters containing from 12 to 18 carbon atoms. Representative waxy monomers are the commercially available monomers such as lauryl methacrylate (approximately 70% by weight straight chain $C_{12}$ methacrylate and 30% by weight $C_{14}$ methacrylate) and stearyl methacrylate (Tg +20° C., approximately 65% by weight $C_{18}$ methacrylate and about 35% by weight $C_{16}$ methacrylate). Various other straight chain acrylate and methacrylate esters containing from about 12 to 24 carbon atoms can be employed. However, acrylates and methacrylates having from about 12 to 18 carbon atoms are preferred.

In general, as the average chain length of the alkyl group of the waxy monomer increases, the final polymer latex tends to increase in polymer particle size, the latex tends to cream and continuous films applied from these latexes tend to become hazier. For example, polymers based on stearyl methacrylate have a larger particle size than polymers based on lauryl methacrylate, yield hazier films than polymers based on lauryl methacrylate and tend to cream. However, while polymers based on stearyl methacrylate form hazy films, formulated polishes based thereon are haze-free. As the average chain length of the alkyl groups of the waxy monomer increases the healability of the formulated polishes remains approximately constant, the gloss increases, and the recoatability properties decrease. For example, polishes prepared from polymers containing commercial lauryl methacrylate can be applied to a substrate and dried to a dry-bright film, which can be recoated immediately after application. After a period of wear this polish can be readily buffed back to its original gloss. A polish based on a polymer containing commercial stearyl methacrylate can be applied to a substrate and dried to a glossy abrasion resistant surface. The recoat properties of these polymers are not as good as those based on lauryl methacrylate. After a period of wear, the latter polish can be buffed back to a glossier shine than a polish based on a polymer containing lauryl methacrylate.

The waxy alkyl esters should comprise from about 10 to 40% by weight of the polymer. At the low end of the range the polishes tend to be somewhat deficient in buffability, i.e. the applied polish surface does not heal on buffing as readily as a polish having somewhat higher concentration of waxy monomer. On the other hand, at the upper end of the range the applied polishes tend to be somewhat soft and tend to pick-up dirt from the floor at a faster rate than is desirable. For best results, it is preferred to employ the long chain waxy esters in a concentration of about 15 to 30% by weight of the monomers to be polymerized.

When the latex polymer is prepared by graft polymerization, optimum buffability and wear properties are obtained by incorporating substantially all the waxy monomer in the backbone polymer and limiting the concentration of hard monomer in the graft portion to less than about two parts by weight per each part by weight of waxy monomer in the backbone portion. As indicated above, the wear properties of these polishes are enhanced by the graft portion. However, if too much hard monomer is present in the graft portion, the buffability of the applied polish tends to decrease. The most advantageous concentration of hard monomer in the graft portion varies somewhat with the nature of the "waxy" monomer. For example, when lauryl methacrylate is the waxy monomer the concentration of hard monomer in the graft portion should be less than about 1.5 parts by weight per part by weight of lauryl methacrylate. With stearyl methacrylate, the hard monomer concentration can be somewhat higher.

The "soft" monomers include alkyl esters of alpha, beta-ethylenically unsaturated carboxylic acids wherein the alkyl group is selected from the class consisting of primary alkyl groups containing less than 12 carbon atoms, secondary alkyl groups of up to 18 carbon atoms and mixtures thereof, such as primary alkyl esters of acrylic acid containing from 1 to 11 carbon atoms, secondary alkyl esters of acrylic acid containing from 1 to 18 carbon atoms, primary alkyl esters of methacrylic acid containing 4 to 11 carbon atoms, secondary alkyl esters of methacylic acid containing from 4 to 18 carbon atoms, etc. Representative soft monomers are methyl acrylate, ethyl acryalte, isopropyl acrylate, butyl acrylate, amyl acrylate, hexyl acrylate, heptyl acrylate, 2-ethylhexyl acrylate, decyl acrylate, butyl methacrylate, amyl methacrylate, undecyl methacrylate, etc. The soft monomer can comprise from about 0 to 30% by weight of the monomers used to form the polymers of this invention. In general the "soft" monomer is used in a concentration sufficient to supplement the action of the "waxy" monomer in reducing the Tg and minimum film forming temperature (MFT) of the polish without compromising other properties. In some cases, it is not possible to regulate the MFT of the polymers of this invention to a sufficiently low level by merely adjusting the concentration of hard monomers and concentration of the particular waxy monomer. If the waxy monomer was used alone to regulate the MFT of the polymer the final polish film might have a tendency to be too soft. On the other hand, soft monomer enables one to employ an optimum concentration of waxy monomer to impart buffability without reducing the other desirable properties of the final polish. However, under no circumstances should the total concentration of waxy monomer and soft monomer be more than 50% by weight of the polymer.

The emulsifier or emulsifiers useful for dispersal or emulsification of monomer may be chosen from a wide variety of nonionic surface active agents and anionic surface active agents. Two or more surface active agents are frequently used, of one or both types. The preferred nonionic surface active agents (alkyphenoxypolyoxyethylene ethanols) are composed of a hydrophobic hydrocarbon portion and a hydrophilic portion. The latter is a chain of 2–120 oxyethylene units while the former has an alkyl group of 4–18 carbon atoms which may be linked to the oxyethylene chain through a phenoxy group. Generally speaking, as the average length of the hydrocarbon chain in the monomer mixture increases, nonionic surface active agents of reduced number of oxyethylene groups should be used, i.e. those of greater oil solubility. Anionic surface active agents are also useful, and it is preferred to include both varieties in the emulsion. The same principles guide the selection of the anionic surface active agent. Typical of these useful anionic surface active agents are ammonium or alkali metal (e.g. sodium) salts of alkyl (e.g. lauryl) ether sulfate, ammonium or alkali metal salts of alkyl phenoxy polyoxyethylene ethanol sulfate esters (and similar polyoxyethylene derivatives), tetra sodium salt of N-(1,2-dicarboxyethyl N-octadecyl sulfosuccinamate (Aerosol 22), alkali metal and ammonium salts of polyelectrolytes, sodium alkyl (e.g. lauryl) sulfate, etc. In large measure, the selection of surface active agent (or agents) for the present copolymers is the same as for prior art emulsion polymerization.

The amount of surface active agent (or agents) required varies primarily with the concentration of monomers to be handled and to a minor extent with the choice of emulsifier, monomers, proportions of monomers and catalysts. Generally, the amount of surface active agent is between 1% and 12% of the total monomer weight and preferably between 3% and 6%. Somewhat the same principles apply in the selection of the amount as is the selection of the surface active agent itself. The proportion must be sufficient to impart the necessary stability, desired rate of polymerization, and particle size.

As polymerization catalysts, there may be used one or more of the peroxidic compounds better known to act as free-radical catalysts which have at least some solubility in aqueous solutions of the emulsifier or which are soluble only in the monomer phase. Among the useful catalysts for the present type of copolymerization are the persulfates including ammonium, sodium and potassium salts, hydrogen peroxide, and the perborates. Also useful are the organic peroxides and hydroperoxides. These include benzoyl peroxide, tertiary butyl hydroperoxide, diisopropyl benzene hydroperoxide, cumene hydroperoxide caproyl peroxide, methylethyl ketone peroxide, etc. Other free-radical catalysts are also useful, such as azodiisobutyronitrile and other aliphatic azo compounds of the type having an acylic azo group and an aliphatic carbon atom on each nitrogen, at least one of which is tertiary. In part, the particular combination of monomers governs the selection of the inorganic or organic peroxide catalysts since some monomers respond better to one variety than they do to another.

The amount of peroxidic catalysts required is about proportional to the concentration of monomers used. The usual range is 0.01% to 3% of catalysts with reference to the weight of the monomer mixture. The preferred range is from 0.10 to 1.0% while the range of 0.4–0.8% is usually best. The optimum amount of catalysts is determined in large part by the nature of the particular monomers selected including impurities which accompany particular monomers.

Frequently, a promoter for the catalysts (sometimes called an "accelerator" or "adjuvant") is used to hasten the reaction at a sufficiently low temperature to avoid coagulation. The promoter may be a reducing agent and together with the peroxidic catalysts is frequently referred to as a "redox system." Many examples of such systems are known and the promoters include ascorbic acid, and soluble sulfites, hydrosulfites, sulfoxalates, thiosulfates, and bisulfites. Particular promoters are exemplified by sodium hydrosulfite, sodium metabisulfites, zinc or sodium formaldehyde sulfoxalate, and calcium bisulfite. Polyvalent metal ions are also used in small concentrations, particularly ferrous ion in the form of ferrous ammonium sulfate at concentrations of a few parts of ferrous ion per million.

The amount of promoter required varies, as is known, with the free-radical initiator chosen and with a particular promoter. The emulsifyiing agent also affects somewhat the amount used as does the particular monomers. At the outside, not more than 3% or less than 0.01% is used in these situations. The preferred range of ascorbic acid is at the low end of this range up to about 0.5% while sulfites are used preferably in an amount of 0.2% to 1%.

Copolymerization is best effected below about 95° C. The preferred range is 30° to 70° C., although slightly lower (10° C.) temperatures are permissible. After most of the monomers have been converted to copolymer, temperatures even higher than 95° C. may then be applied. In fact, after most of the monomers have copolymerized, the resulting emulsion copolymer system can be heated to boiling without breaking the emulsion. During polymerization the temperature can be controlled in part by the rate at which monomers are supplied and polymerized and/or by applied cooling.

The polymerization can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. When this technique is employed, the waxy monomer must be added to the reaction zone in emulsified form and the addition of waxy monomer terminated prior to the termination of the addition of other monomer. Failure to emulsify the waxy monomer leads to incomplete polymerization of the waxy monomer and large particle size emulsions, which are unsuitable for use in floor polishes, i.e. the polishes lack the necessary gloss. If waxy monomer is added after the completion of the addition of the other monomers, there tends to be incomplete polymerization of the waxy monomer and polishes formulated from the resultant latex are deficient in wear properties. An advantage of gradual addition of monomers lies in reaching a high solids content with optimum control. Additional catalysts or additional components of the redox system may be added as polymerization proceeds, and these can be used to control the speed of reaction to avoid overheating.

A convenient method of carrying out the polymerization utilizing the preceding principles comprises preparing separate premixtures as follows: (I) a first monomer premixture which contains substantially all the waxy monomer in emulsified form; and (II) a second monomer premixture which contains the balance of the monomers to be polymerized. The emulsified waxy monomer is preferably prepared by dissolving emulsifier in waxy monomer, adding this to cold water (5–25° C.), followed by high speed agitation (by Waring Blendor or ultrasonics). In this way emulsified monomer is formed having a particle size of about 0.01 to 0.5 microns. Catalyst is added to a reactor containing about 10 to 50 weight percent of the first monomer premixture and about 10 to 60 weight percent of the second monomer premixture. After the reaction becomes exothermic, the remainder of the monomer premixtures are added gradually either continuously or incrementally over a time sufficient to permit the temperature to be controlled throughout the reaction. The first monomer premixture is preferably added in about 2 to 10 increments while the second monomer premixture is added continuously. In this way one can visually observe the utilization of waxy monomer as the emulsion goes from opaque (high in waxy monomer) to translucent (relatively free of waxy monomer) and be certain that substantially all of the waxy monomer is polymerized. Whether continuous or incremental addition of one or both of the monomer charges is employed, the addition of waxy monomer to the reaction zone should be completed prior to the termination of the second monomer premixture and the emulsion should be translucent. Additional catalyst and/or promoter is added when necessary to maintain the reaction. Finally, the reaction is permitted or forced to go to completion, which is ensured by raising the temperature to about 85° C. and/or by the addition of additional catalyst and/or promoter.

In the preferred method of operation, wherein a hard raft portion is superimposed on a backbone polymer containing waxy monomer units, essentially the same technique described in the preceding paragraph is employed using the following premixtures:

(I) a first monomer premixture which contains substantially all the waxy monomer in emulsified form, (II) a second monomer premixture which contains at least part of the hard monomer wherein the monomers forming the first and second monomer premixtures have an average monomer Tg of about 30 to 70° C. and comprises from about 50 to 95 percent by weight of the final graft copolymer; and (III) a third monomer premixture which contains the balance of the monomers to be polymerized wherein the monomers forming the third monomer premixture have an average monomer Tg of at least 80° C. and the hard monomer content of the third monomer premixture is up to about two parts by weight per part by weight of waxy monomer in the first monomer premixture.

Catalyst is added to a reactor containing about 10 to 50 weight percent of the first monomer premixture and about 10 to 60 weight percent of the second monomer premixture. After the reaction becomes exothermic, the remainder of the first and second monomer premixtures are added gradually either continuously or incrementally, as explained in the preceding paragraph, care being taken to be sure that substantially all of the first monomer premixture is added prior to the termination of addition of the second monomer premixture. After substantially all of the first and second monomer premixtures are reacted, the third monomer premixture is added to the reaction zone either batchwise or continuously or incrementally. The reaction is initiated again and forced to completion.

If desired, a wax of the type used in floor polish compositions can be added to the reactor after the backbone polymer is formed, but before the initiation of the graft polymerization step. In such cases, essentially all the acid monomer should be incorporated in the backbone polymer, and the strongly acidic latex adjusted with volatile base, such as ammonia or morpholine, to a pH of about 6.5 to 8.0. When added in a concentration of up to about 30% by weight of the latex polymer solids, the wax seems to act as an extender for the polymer latex and does not noticeably decrease the dry-bright properties of polishes formulated with additional wax. The pH adjustment is necessary in order to ensure that the polymer latex has the proper stability and particle size. If the graft step is carried out at a pH below 6.5 in the presence of wax the polymeric latex composition tends to be somewhat unstable, while at a pH above 8.0, the particle size and latex viscosity increase undesirably. If wax is omitted, it is desirable to include all the acid monomer in the polymer backbone and carry out the graft step at a pH of 5 to 8.0. Latex prepared in this manner seems to be somewhat more stable and tends to impart better wear properties to formulated polishes.

The resulting emulsion copolymer can be adjusted to a pH of from about 7 to 10 with a volatile alkali, such as ammonia or morpholine. The copolymers can be shipped in either form, neutralized or not, to a floor polish formulator or formulated with the other ingredients of the floor polish immediately after polymerization.

Floor polishes can be prepared from the latex polymers of this invention by adding wax, alkali-soluble resin, coalescing agents, polyvalent metal salts and chelates, if desired, such as those described in commonly assigned copending application Ser. No. 541,095, filed Apr. 8, 1966, etc.

Suitable waxes include carnauba wax, candelilla wax, Fischer-Tropsch wax, oxidized polyethylene wax, polyethylene emulsion, modified Montan wax or ester wax, mixtures of rosin amine in polyethylene emulsion, copolymers of ethylene with acrylate esters, etc. The wax and latex polymer together impart mar resistance, buffability, flexibility and soap-and-water resistance to the applied polish. Wax can be used in a concentration of from about 2 to 300 parts per 100 parts by weight dry polymer, preferably about 10 to 100 parts by weight wax per 100 parts by weight dry polymer. In general, as the ratio of wax to polymer increases the buffability of applied polishes increase and the dry bright properties decrease. However, in the preferred range of 10 to 100 parts by weight wax, the formulated polishes have the desired combination of high buffability and dry-bright polish properties. Optimum properties have been obtained using from 2 to 4 parts by weight polymer per part by weight wax.

The alkali-soluble resins utilized in this invention perform their normal leveling function as in most alkaline floor polishes. Suitable alkali soluble resins include shellac; alkali-soluble homopolymers and copolymers of alpha, beta-ethylenically unsaturated monocarboxylic acids having a molecular weight of about 1,000 to 5,000, such as polyacrylic acid, polymethacrylic acid, copolymer of ethyl acrylate and acrylic acid, etc.; alkali soluble maleic anhydride copolymers with monomers such as styrene or vinyl methyl ether; the product of hydrolysis of the said maleic anhydride polymers; alkyl esters of the said hydrolysis products; terpene maleic anhydride condensation products; rosin adducts of polyesters of which esters glycol and glycerin succinate, adipate and maleate are examples; alkali soluble phenol formaldehyde condensates, etc. The alkali-soluble resins can be used in a concentration up to about 40 parts by weight (preferably 1 to 15 parts by weight) per 100 parts dry latex polymer.

Other additives, are common in floor polishes, include methyl Carbitol and/or tributoxyethyl phosphate and/or 2-pyrrolidone, which act as leveling agents, softeners (plasticizers) and coalescing agents; fluorinated compounds of U.S. Pat. No. 2,937,098, such as FC–134 sold by Minnesota Mining and Manufacturing Company, which serve as leveling aids, etc. These additives must be employed in order to give the floor polish the necessary coalescing properties.

The various ingredients of the floor polish are formulated in water at about 8 to 20% by weight total solids concentration. The alkali soluble resin, wax and/or one or more leveling agents, coalescing agents and/or plasticizers is added to the floor polish, such as methyl Carbitol, tributoxyethyl phosphate or fluorcarbon surface active agent. The floor polish is then adjusted, if necessary, to pH of about 8 to 10.

The following examples are merely illustrative and should not be construed as limiting the scope of this invention. In the examples, the word "parts" refers to parts by weight.

EXAMPLE I

The following premixtures were prepared to be used in the preparation of a preferred floor polish polymer of this invention:

Emulsifier premixture: Parts dry weight
  Sodium lauryl sulfate _____ 4.5
  Water _____ 404.0

First monomer premixture: Parts dry weight
- Lauryl methacrylate (commercial) _____ 80.0
- Bis (tridecyl) ester of sodium sulfosuccinic acid (Aerosol TR) _____ 2.8
- Nonylphenyl ether of polyoxyethylene (10.5) glycol (Tergitol NPX) _____ 10.0
- Water _____ 201.1

Second monomer premixture:
- Ethyl acrylate _____ 25.0
- Methyl methacrylate _____ 151.0
- Acrylonitrile _____ 76.0
- Styrene _____ 48.0
- Methacrylic acid _____ 20.0
- Carbitol solvent _____ 10.0

Third monomer premixture:
- Styrene _____ 100.0

The emulsifier premixture was prepared in cold water in a suitable glass-lined reactor fitted with a stirrer and jacket. The first monomer premixture was emulsified in cold water in a Waring Blendor. After the reactor and first monomer premixture were cooled to about 35° C., one-third of the first monomer premixture, 15% of the second monomer premixture, 0.05 parts ferrous sulfate, 0.1 parts ammonium persulfate in 7 parts water and 0.1 parts sodium metabisulfite in 7 parts water were added to the reactor. After the reaction started the remainder of the second monomer premixture, 0.9 parts of ammonium persulfate in 63 parts water and 0.9 parts of sodium metabisulfite in 63 parts water were slowly added to the reactor while maintaining the reaction at about 49–51° C. At the same time, the remainder of the first monomer premixture was added in five equal parts as the latex changed from milky to translucent, the last increment being added before the addition of the second monomer premixture was completed. After the polymerization was complete, the reactants were adjusted to pH 7 with aqueous ammonium hydroxide. The latex polymer at this point had a Tg of 60° C. The third monomer premixture and 0.5 parts t-butyl hydroperoxide and 0.1 parts ascorbic acid in 20 parts water were added to the reactor and polymerized at about 40–60° C. The resultant graft polymer had a Tg of 69° C.

EXAMPLE II

This example illustrates the preparation of a dry-bright fully buffable polish from the graft polymer latex of Example I. Two anionic wax emulsions at fifteen percent by weight solids were prepared by compounding (A) 40 parts oxidized polyethylene (AC-540), 7 parts oleic acid, 3 parts of a mixture of 1 part 85% by weight KOH and 2 parts ethylene glycol, 7 parts morpholine and 263 parts water and (B) 100 parts oxidized polyethylene (AC-680), 20 parts oleic acid, 20 parts morpholine and 660 parts water. The polish was prepared by adding, in order 15.0 parts of wax emulsion A (15% by weight solids), 10 parts wax emulsion B (15% by weight solids), 5 parts of 15% by weight solids alkali-soluble resin formed by dissolving Shanco 334 (terpene-phenolic) in 27 parts 26°Be' NH₄OH and 539 parts water, 1 part tributoxyethyl phosphate, 0.5 parts cationic surface active agent having a long fluorocarbon group and a solubilizing organic group (FC-134 at 1% by weight solids), 2 parts methyl Carbitol with good agitation to 70 parts of the graft polymer latex of Example I, diluted with water to 15% solids.

EXAMPLE III

This example illustrates that high polymer floor polishes prepared from the polymers of this invention are equal to or superior in performance to commercial buffable floor polishes and dry-bright nonbuffable polishes. The polish of Example II, a commercial carnauba buffable polish, a commercial buffable carnauba polish fortified with about 20% by weight latex polymer and a commercial dry-bright polish were applied to asphalt floors in the corridors of a school. Each polish was applied with mop, buffed and maintained by damp mopping with neutral solution every four to seven days. At the end of two weeks the floors were evaluated prior to cleaning and rebuffing and after cleaning and rebuffing. The results are set forth below in Table I.

TABLE I

| | Polish of Ex. II | Carnauba polish | Fortified carnauba | Dry-bright |
| --- | --- | --- | --- | --- |
| Property evaluated before washing: | | | | |
| General appearance | Very good | Good | Good | Very good. |
| Black heel marking | Light to medium | Light to medium | Light to medium | Very little. |
| Gloss | Very good | Fair | Fair | Fair to poor. |
| Scuff marks visible | Slight | Medium | Medium | Slight. |
| After washing and rebuffing: | | | | |
| Gloss | Excellent* | Good | Fair to poor | No improvement. |
| Scuff marks | Removed | Removed | Visible | Visible. |
| Black heel marks | Partially removed | Partially removed | Partially removed | Unchanged. |

*Gloss was excellent after washing, and buffing was not necessary in order to optimize gloss.

The above table clearly shows that dry bright buffable floor polishes, prepared with the polymer latexes of this invention, are superior in overall properties to commercial buffable polishes.

After four weeks on the floor the polish of Example II still had essentially the same properties as illustrated in the above table.

EXAMPLE IV

The backbone polymer prepared in Example I having a Tg of 60° C. was formulated into a floor polish in the manner described in Example II. The polish of Example II and the polish of this example were applied to tiles mounted on panels in the corridor of a building and evaluated. Both polishes formed dry-bright glossy coatings and were recoated after thirty minutes. Periodically the panels were damp mopped and after about a week rebuffed. The overall properties of the two polishes after one week were essentially the same except that the polish of this example had picked up somewhat more dirt. However, buffability was equivalent.

EXAMPLE V

Example I was repeated except that the emulsified lauryl methacrylate was added continuously instead of incrementally. As in Example I, the addition of lauryl methacrylate was terminated prior to the termination of the addition of the second monomer premixture. The backbone polymer had a Tg of 60° C. and the graft polymer had a Tg of 67° C. A polish prepared from the graft copolymer in the manner described in Example II was comparable to the polish of Example II.

EXAMPLE VI

Example I was repeated except that commercial stearyl methacrylate was substituted for lauryl methacrylate, yielding a larger particle size polymer emulsion having a Tg of 61° C., which had a tendency to cream. A floor polish prepared from the graft copolymer of this example in the manner described in Example II formed a dry bright glossy film. After a period of wear, the polish was rebuffed to a glossier shine than the polish of Example II.

EXAMPLE VII

Example I was repeated except that 100 parts polyethylene latex (40% solids) was added to the reactor at the same time as styrene. A polish prepared from this product in the manner described in Example II had essentially the same properties as the polish of Example II.

EXAMPLE VIII

A polish having the same properties as the polish of Example II was prepared by replacing the two wax emulsions used in Example II with 25 parts of a 15% by weight solids wax prepared by blending 4.0 parts Hoechst Wax KSL (Montan wax), 6.0 parts Epoline E-10 (polyethylene), 5.0 parts Petolite C-700 (microcrystalline wax), 1.0 part fatty acid, 1.0 part diethylaminoethanol, 2.0 parts methyl Carbitol, and 81.0 parts water.

EXAMPLE IX

This example illustrates that the polymers of this invention can be advantageously used in high wax buffable polishes. A polish was prepared by adding, in order, 14.4 parts of 15% by weight solids Durez 19788 (polyester), 57.0 parts of the 15% by weight solids wax emulsion of Example VIII, 0.895 part Carbitol, 0.45 part tributoxyethyl, and 0.45 part FC–134 with good agitation to 28.6 parts of the graft polymer latex of Example I, diluted to 15% solids. A second polish was prepared in the same manner except that the graft polymer latex was omitted. The polishes were applied to tiles mounted on panels in the corridor of a building. The polishes were damp mopped every other day. The polish containing the graft polymer latex of this invention showed very little scuffing after two weeks, while the other polish exhibited considerable scuffing after two days. Further, the polish containing graft copolymer was slip resistant.

EXAMPLE X

Example I was repeated except that a mixture of 40 parts commercial lauryl methacrylate and 40 parts commercial stearyl methacrylate was used in place of the 80 parts lauryl methacrylate. The resultant graft polymer latex had a Tg of 55° C. A floor polish prepared from the graft copolymer of this example in the manner described in Example II formed a dry bright gloss film, which could be recoated after thirty minutes. After a period of wear, the polish was rebuffed to a glossier shine than the polish of Example II.

While this invention is principally directed to a new polymer latex suitable for the preparation of fully buffable dry-bright floor polishes, an additional feature of this invention, as above explained, is a method for incorporating waxy monomer into a latex polymer. The process, as explained above, comprises feeding separate flows (continuously or incrementally) of emulsified waxy monomer and copolymerizable monomer into a reaction chamber containing water, wherein the quantity of waxy monomer required for the polymerization reaction is introduced into the reaction chamber at such rate that the addition of the total waxy monomer required is completed before completion of the addition of the total monomer or comonomers required for polymerization is completed. As explained, failure to add the waxy monomer is emulsified from results in large particle size latexes, which are unsuitable for the preparation of high gloss floor polishes. Failure to complete the addition of waxy monomer before the completion of the addition of comonomer results in incomplete polymerization of waxy monomer and/or latexes which can not be compounded into floor polishes having the desired wear properties. When polymerized in this manner the ratio of waxy monomer to other monomers can range from about 1:1 to 1:9 on a weight basis.

Since many embodiments may be made of this invention, and since many changes may be made in the embodiments described, the foregoing is to be interpreted as illustrative only and the invention is defined by the claims following hereafter.

We claim:

1. A latex composition suitable for the preparation of completely buffable dry-bright polishes containing a 1-to-1 or higher weight ratio of polymer to wax comprising at least one surface active agent selected from the group consisting of nonionic and anionic surface active agents and a polymer having an average monomer Tg of at least 40° C. comprising:
    (A) from 1 to 15% by weight of alpha, beta-ethylenically unsaturated acid,
    (B) from 45 to 85% by weight of ethylenically unsaturated hard monomer comprising at least one monomer selected from the group consisting of monovinyl aromatic, alpha, beta-ethylenically unsaturated nitrile and hard esters of alpha, beta-ethylenically unsaturated carboxylic acid,
    (C) from 10 to 40% by weight of waxy straight chain alkyl esters selected from the group consisting of lauryl methacrylate, stearyl methacrylate and mixtures thereof,
    (D) from 0 to 30% by weight of soft alkyl ester of alpha, beta-ethylenically unsaturated carboxylic acid wherein said alkyl group is selected from the class consisting of primary alkyl groups containing less than 12 carbon atoms, secondary alkyl groups and mixtures thereof, and the total concentration of waxy alkyl ester and soft alkyl ester is from about 10 to 50% by weight, wherein said polymer is a graft copolymer comprising from about 50 to 95% by weight of a backbone polymer having an average monomer Tg of about 30 to 70° C. comprising at least part of monomer (B) and substantially all of monomer (C) and a graft portion comprising the remainder of monomers (A), (B), (C) and (D) in such proportions that said monomers have an average monomer Tg of at least about 80° C.

2. The latex of claim 1, wherein said waxy monomer comprises lauryl methacrylate, and hard monomer is present in the graft portion in a concentration less than about 1.5 parts by weight per part by weight of waxy monomer in the backbone portion.

3. The process of preparing a latex suitable for the preparation of completely buffable dry-bright polishes containing a 1-to-1 or higher weight ratio of polymer to wax which comprises feeding separate flows of emulsified waxy monomer having a particle size of about 0.01 to 0.5 micron and at least one copolymerizable monomer selected from the group consisting of alpha, beta-ethylenically unsaturated acid, monovinyl aromatic, alpha, beta-ethylenically unsaturated nitrile, hard alkyl ester of alpha, beta-ethylenically unsaturated carboxylic acid and soft alkyl ester of alpha, beta-ethylenically unsaturated carboxylic acid into a reaction chamber, wherein the quantity of waxy monomer required for the polymerization is introduced into the reaction chamber at such rate that the addition of the total waxy monomer required is completed before completion of the addition of the total monomers required for polymerization is completed, and said waxy monomer comprises straight chain alkyl esters of alpha, beta-ethylenically unsaturated carboxylic acids having the structure

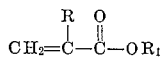

wherein each R is selected from the group consisting of hydrogen and methyl and each $R_1$ is a straight chain unsubstituted alkyl group of at least 12 carbon atoms and the average length of $R_1$ is more than 12 carbon atoms.

4. The process of claim 3, wherein the weight ratio of waxy monomer to other monomer ranges from about 1:1 to 1:9.

5. The process of claim 4, wherein the waxy monomer comprises a mixture of at least two esters containing from 12 to 18 carbon atoms in the alkyl group.

6. The process of claim 5, wherein the waxy monomer comprises lauryl methacrylate.

7. The process of claim 5, wherein the waxy monomer comprises stearyl methacrylate.

8. The process of claim 5, wherein said other monomer comprises a mixture of methyl methacrylate and at least one member selected from the group consisting of monovinyl aromatics and alpha, beta-ethylenically unsaturated nitriles, the methyl methacrylate is present in a concentration greater than the concentration of monovinyl aromatic and the methyl methacrylate is present in a concentration greater than the concentration of alpha, beta-ethylenically unsaturated nitriles.

9. The process of claim 4, wherein said waxy monomer is added in increments and said other monomer is added continuously.

10. The process of claim 4, wherein said waxy monomer flow and other monomer flow are added continuously.

11. The process of preparing a latex suitable for the preparation of completely buffable dry-bright polishes containing a 1-to-1 or higher weight ratio of polymer to wax which comprises feeding separate flows of emulsified waxy monomer having a particle size of about 0.01 to 0.5 micron and at least one copolymerizable monomer selected from the group consisting of alpha, beta-ethylenically unsaturated acid, monovinyl aromatic, alpha, beta-ethylenically unsaturated nitrile, hard alkyl ester of alpha, beta-ethylenically unsaturated carboxylic acid and soft alkyl ester of alpha, beta-ethylenically unsaturated carboxylic acid into a reaction chamber, wherein the quantity of waxy monomer required for the polymerization is introduced into the reaction chamber at such rate that the addition of the total waxy monomer required is completed before completion of the addition of the total monomers required for polymerization is completed, said waxy monomer comprising straight chain alkyl esters of alpha, beta-ethylenically unsaturated carboxylic acids having the structure

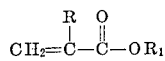

wherein each R is selected from the group consisting of hydrogen and methyl and each $R_1$ is a straight chain unsubstituted alkyl group of at least 12 carbon atoms and the average length of $R_1$ is more than 12 carbon atoms.

12. A buffable dry-bright polish comprising wax, at least one surface active agent selected from the group consisting of nonionic and anionic surface active agents and polymer having an average monomer Tg of at least 40° C., wherein said polymer comprises:
  (A) from 1 to 15% by weight of alpha, beta-ethylenically unsaturated acid,
  (B) from 45 to 85% by weight of ethylenically unsaturated hard monomer, comprising at least one monomer selected from the group consisting of monovinyl aromatic, alpha, beta-ethylenically unsaturated nitrile, and hard ester of alpha, beta-ethylenically unsaturated carboxylic acid,
  (C) from 10 to 40% by weight of waxy straight chain alkyl esters of alpha, beta-ethylenically unsaturated carboxylic acids having the structure

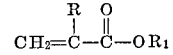

wherein each R is selected from the group consisting of hydrogen and methyl and each $R_1$ is a straight chain unsubstituted alkyl group of at least 12 carbon atoms,
  (D) from 0 to 30% by weight of soft alkyl ester of alpha, beta-ethylenically unsaturated carboxylic acid wherein said alkyl group is selected from the class consisting of primary alkyl groups containing less than 12 carbon atoms, secondary alkyl groups and mixtures thereof, and the total concentration of waxy alkyl ester and soft alkyl ester is from about 10 to 50% by weight.

13. The composition of claim 12, wherein said wax comprises from about 10 to 100 parts by weight per 100 parts by weight of polymer solids.

14. The composition of claim 13, wherein the waxy monomer comprises a mixture of at least two esters containing from 12 to 18 carbon atoms in the alkyl group.

15. The composition of claim 12, wherein said hard monomer comprises a mixture of methyl methacrylate and at least one member selected from the group consisting of monovinyl aromatics and alpha, beta-ethylenically unsaturated nitriles, and the methyl methacrylate is present in a concentration greater than the total concentration of monovinyl aromatics and is present in a concentration greater than the total concentration of alpha, beta-ethylenically unsaturated nitriles.

16. The composition of claim 15, wherein said waxy monomer comprises a mixture of $C_{12}$ and $C_{14}$ alkyl methacrylates.

17. The composition of claim 15, wherein said waxy monomer comprises a mixture of $C_{16}$ and $C_{18}$ alkyl methacrylates.

18. The composition of claim 12, wherein said polymer is a graft copolymer comprising from about 50 to 95% by weight of a backbone polymer having an average monomer Tg of about 30 to 70° C. comprising at least part of monomer (B) and substantially all of monomer (C), and a graft portion comprising the remainder of monomers (A), (B), (C), and (D) in such proportions that said monomers having an average monomer Tg of at least about 80° C.

19. The composition of claim 18, wherein said waxy monomer comprises a mixture of at least two esters containing from 12 to 18 carbon atoms in the alkyl group, and hard monomer is present in the graft portion in a concentration less than about 2 parts by weight per part by weight of waxy monomer in the backbone portion.

20. The composition of claim 19, wherein said waxy monomer comprises a mixture of $C_{12}$ and $C_{14}$ alkyl methacrylates, and hard monomer in the graft portion contains less than about 1.5 parts by weight per part by weight of waxy monomer in the backbone portion.

References Cited

UNITED STATES PATENTS

| | | |
|---|---|---|
| 2,795,564 | 6/1957 | Conn et al. |
| 2,972,592 | 2/1961 | Brown et al. |
| 3,011,988 | 12/1961 | Luedka et al. |
| 3,244,655 | 4/1966 | Sullivan et al. |
| 3,251,906 | 5/1966 | Bauer _____ 260—881 |
| 3,320,198 | 5/1967 | Hill. |

MURRAY TILLMAN, Primary Examiner

H. ROBERTS, Assistant Examiner

U.S. Cl. X.R.

117—161; 260—27, 29.6, 80.8, 881, 885

PO-1050
(5/69)

UNITED STATES PATENT OFFICE
CERTIFICATE OF CORRECTION

Patent No. 3,532,654            Dated October 6, 1970

Inventor(s) William M. Finn and Francis L. McCarthy

It is certified that error appears in the above-identified patent and that said Letters Patent are hereby corrected as shown below:

Column 1, line 31, for "way" read ---wax---. Column 2, line 5, for "43" read ---34---. Column 3, lines 21 and 22, for "polymer to polymer to" read ---polymer to---. Column 3, lines 22 and 23, for "relatively polymer", read ---relatively soft latex polymer---. Column 5, line 3, for "title" read ---tile---. Column 5, line 32, for "aipha" read ---alpha---. Column 6, line 51, for "ethyl acryalte" read ---ethyl acrylate---. Column 8, line 11, for "emulsifyiing" read ---emulsifying---. Column 9, line 5, for "emplyed" read ---employed---. Column 9, line 15, for "raft" read ---graft---. Column 9, line 66, for "pH above 8.0" read ---pH above about 8.0---. Column 10, line 47, for "additives, are" read ---additives, as are---. Column 13, lines 24 and 25, for "tributoxyethyl, and" read ---tributoxyethyl phosphate, and---. Column 13, lines 62 and 63, for "monomer is emulsified from" read ---monomer in emulsified form---. Column 15, line 48, for "atoms." read ---atoms, followed by the steps of adding additional monomer to said polymerization zone and grafting said additional monomer to the preformed polymer.---

SIGNED AND
SEALED
MAR 2 1971

(SEAL)
Attest:

Edward M. Fletcher, Jr.
Attesting Officer

WILLIAM E. SCHUYLER, JR.
Commissioner of Patents